US012636758B2

(12) United States Patent
Herritz

(10) Patent No.: US 12,636,758 B2
(45) **Date of Patent: *May 26, 2026**

(54) TOOL WITH PIVOTING PORTION AND LOCKING MECHANISM

(71) Applicant: Milwaukee Electric Tool Corporation, Brookfield, WI (US)

(72) Inventor: Devin W. Herritz, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,757

(22) Filed: Apr. 19, 2024

(65) Prior Publication Data

US 2024/0261942 A1 Aug. 8, 2024

Related U.S. Application Data

(63) Continuation of application No. 17/573,337, filed on Jan. 11, 2022, now Pat. No. 11,986,927, which is a continuation of application No. PCT/US2021/065215, filed on Dec. 27, 2021.

(60) Provisional application No. 63/131,045, filed on Dec. 28, 2020.

(51) Int. Cl.

*B25B 13/46* (2006.01)
*B25B 13/48* (2006.01)
*B25G 1/06* (2006.01)

(52) U.S. Cl.

CPC .......... *B25B 13/461* (2013.01); *B25B 13/481* (2013.01); *B25G 1/063* (2013.01)

(58) Field of Classification Search

CPC . B25B 13/461; B25B 13/481; B25B 23/0028; B25G 1/063

USPC .............................................. 81/177.8, 177.9

See application file for complete search history.

(56) References Cited

U.S. PATENT DOCUMENTS

| | | | | |
|---|---|---|---|---|
| 1,473,436 A | | 11/1923 | Leopold | |
| 1,942,640 A | | 1/1934 | Fromme | |
| 4,901,608 A | | 2/1990 | Shieh | |
| 5,199,335 A | | 4/1993 | Arnold et al. | |
| 6,155,143 A | * | 12/2000 | Wu | B25G 1/043 81/436 |
| 6,186,034 B1 | | 2/2001 | Lamons | |

(Continued)

FOREIGN PATENT DOCUMENTS

| | | |
|---|---|---|
| CN | 105014591 | 4/2017 |
| DE | 3006651 | 8/1981 |

(Continued)

OTHER PUBLICATIONS

International Search Report and Written Opinion for International Application No. PCT/US2021/065215, dated Oct. 15, 2024, 10 pages.

(Continued)

*Primary Examiner* — Hadi Shakeri

(74) *Attorney, Agent, or Firm* — Reinhart Boerner Van Deuren s.c.

(57) ABSTRACT

A tool with a pivoting head is shown. The tool includes a locking mechanism that allows the angular position of the head to be locked securely in place once selected by a user. The locking mechanism may be used with a variety of tools, such as ratchet wrenches, that allow for repositioning of the head relative to the handle of the tool.

20 Claims, 9 Drawing Sheets

(56) References Cited

U.S. PATENT DOCUMENTS

| | | | | |
|---|---|---|---|---|
| 6,209,422 | B1 * | 4/2001 | Kamiya | B25B 21/004 81/62 |
| 6,267,032 | B1 | 7/2001 | Hsieh | |
| 6,321,855 | B1 * | 11/2001 | Barnes | B25B 23/00 279/157 |
| 6,382,058 | B1 | 5/2002 | Owoc | |
| 6,405,621 | B1 | 6/2002 | Krivec et al. | |
| 6,557,442 | B1 | 5/2003 | Owoc | |
| 6,857,341 | B1 | 2/2005 | Cheng | |
| 6,877,404 | B2 | 4/2005 | Chen | |
| 6,957,600 | B2 | 10/2005 | Hu | |
| 7,000,507 | B1 | 2/2006 | Lin | |
| 7,059,218 | B1 | 6/2006 | Lin et al. | |
| 7,082,862 | B2 | 8/2006 | Lee | |
| 7,131,356 | B2 | 11/2006 | Lin | |
| 7,165,480 | B2 | 1/2007 | Lin | |
| 7,168,346 | B2 | 1/2007 | Lin | |
| 7,171,875 | B2 | 2/2007 | Hu | |
| 7,174,815 | B1 | 2/2007 | Hsieh | |
| 7,318,366 | B2 | 1/2008 | Lee et al. | |
| 7,401,538 | B2 | 7/2008 | Cheng | |
| 8,028,607 | B2 | 10/2011 | Lee et al. | |
| 8,109,183 | B2 * | 2/2012 | Santamarina | B25B 23/1405 81/477 |
| 8,245,604 | B2 | 8/2012 | Chen | |
| 8,276,485 | B1 | 10/2012 | Chen | |
| 8,413,553 | B2 | 4/2013 | Chen | |
| 8,459,151 | B2 | 6/2013 | Wang et al. | |
| 8,474,350 | B2 | 7/2013 | Lee et al. | |
| 8,539,864 | B1 | 9/2013 | Kennedy | |
| 8,695,459 | B2 | 4/2014 | Lee et al. | |
| 9,132,535 | B2 | 9/2015 | Hsieh | |
| 9,302,373 | B2 | 4/2016 | Johnson | |
| 9,327,388 | B2 | 5/2016 | Chen | |
| 9,452,515 | B2 | 9/2016 | Lee | |
| 9,511,485 | B2 | 12/2016 | Chang | |
| 2002/0092387 | A1 | 7/2002 | Lee | |
| 2005/0061117 | A1 | 3/2005 | Chen | |
| 2005/0172763 | A1 * | 8/2005 | Chang | B25B 23/1427 81/467 |
| 2005/0274234 | A1 | 12/2005 | Lee | |
| 2007/0283790 | A1 | 12/2007 | Cheng | |
| 2009/0000430 | A1 | 1/2009 | Wu | |
| 2009/0090223 | A1 | 4/2009 | Wu | |
| 2011/0017028 | A1 | 1/2011 | Kuo | |
| 2011/0226099 | A1 | 9/2011 | Chen | |
| 2015/0013503 | A1 | 1/2015 | Lee et al. | |
| 2015/0360352 | A1 | 12/2015 | Chen | |
| 2017/0320199 | A1 | 11/2017 | Frye | |

FOREIGN PATENT DOCUMENTS

| | | |
|---|---|---|
| DE | 3023882 | 4/1989 |
| DE | 202006006369 | 7/2006 |
| DE | 102010000162 | 7/2013 |
| DE | 102011002465 | 7/2014 |
| EP | 0070725 | 1/1983 |
| EP | 0309880 | 11/1992 |
| EP | 0755757 | 12/1999 |
| EP | 1958736 | 8/2008 |
| EP | 1637287 | 11/2009 |
| JP | 06031640 | 2/1994 |

OTHER PUBLICATIONS

International Search Report and Written Opinion for International Application No. PCT/US2021/065215, dated Apr. 27, 2022, 12 pages.

* cited by examiner

TOOL WITH PIVOTING PORTION AND LOCKING MECHANISM

CROSS-REFERENCE TO RELATED PATENT APPLICATIONS

The present application is a continuation of U.S. patent application Ser. No. 17/573,337, filed on Jan. 11, 2022, which is a continuation of International Patent Application No. PCT/US2021/065215, filed on Dec. 27, 2021, which claims the benefit of and priority to U.S. Provisional Application No. 63/131,045, filed on Dec. 28, 2020, which are incorporated herein by reference in their entireties.

BACKGROUND OF THE INVENTION

The present invention relates generally to the field of tools. The present invention relates specifically to a tool, such as a ratcheting wrench, with a pivoting head.

SUMMARY OF THE INVENTION

One embodiment of the invention relates to a driving tool. The tool includes a head, a body, a workpiece engagement structure, and a ratchet mechanism. The workpiece engagement structure is coupled to the head. The ratchet mechanism is supported by the head and coupled to the workpiece engagement structure. The tool further includes a pivot joint positioned between the body and the head and coupling the head to the body such that head is rotatable about the pivot joint to a plurality of angular positions relative to the body. The locking mechanism includes an engagement member with an open section defined between a pair of opposing sidewalls and a base wall. The locking mechanism further includes a control mechanism. The control mechanism includes a shaft coupled to and extending from an actuator. The shaft extends into the open section of the engagement member. The locking mechanism further includes a biasing element that engages the engagement member and provides a force that biases the engagement member toward engagement with the pivoting head. The locking mechanism is moveable between a locked position in which the angular position of the head relative to the body is fixed and an unlocked position in which the head is pivotable about the pivot joint.

Another embodiment relates to a driving tool. The tool includes a body that defines a cavity and a head coupled to the body. The head is pivotable about a pivot joint to a plurality of angular positions relative to the body and includes a toothed projection extending toward the body. The tool includes a workpiece engagement structure coupled to the head and a ratchet mechanism supported by the head and coupled to the workpiece engagement structure. The tool further includes a locking mechanism positioned within the cavity of the body. The locking mechanism includes an engagement member with an open section defined between a pair of opposing sidewalls and a base wall. The locking mechanism further includes a control mechanism. The control mechanism includes a shaft coupled to and extending from an actuator. The shaft extends into the open section of the engagement member. The locking mechanism further includes a biasing element that engages the engagement member and biases the engagement toward the head. The locking mechanism is moveable between a locked position in which the biasing element pushes the engagement member into engagement with the head such that the angular position of the head is fixed relative to the body and an unlocked position in which the head is pivotable relative to the body.

Another embodiment relates to a driving tool. The tool includes a body that defines a cavity and a head pivotably coupled to the body such that the head is moveable about a pivot joint to a plurality of angular positions relative to the body. The tool includes a workpiece engagement structure coupled to the head and a ratchet mechanism supported by the head and coupled to the workpiece engagement structure. The tool further includes a locking mechanism positioned within the cavity of the body. The locking mechanism includes an engagement member with an open section defined between a pair of opposing sidewalls and a base wall. The locking mechanism further includes a control mechanism. The control mechanism includes an actuator and a shaft coupled to and extending from an actuator. The shaft extends into the open section of the engagement member. The control mechanism further includes an expanded end section of the shaft opposite the actuator, a cam section positioned between the actuator and the expanded section of the shaft, and a reduced diameter section positioned between the cam section and the end section of the shaft. The cam section extends within the open section of the engagement member. The tool further includes a biasing element that engages with the engagement member and applies a locking force to secure the head in a locked position.

One embodiment of the invention relates to tool with a pivoting head. The tool includes a head and a body. The tool includes a pivot joint coupling the head to the body such that head is rotatable about the pivot joint to a plurality of angular positions relative to the body. The tool includes a locking mechanism that is moveable between a locked position in which the angular position of the head relative to the body is maintained and an unlocked position in which the head is permitted to pivot about the pivot joint. The locking mechanism includes an engagement member with a cavity defined between a pair of opposing sidewalls and a base wall. The locking mechanism includes an actuator coupled to a shaft that extends into the cavity of the engagement member. The shaft includes a cam section located between the actuator and an end of the shaft. The cam section of the shaft is located within the cavity of the engagement member. The shaft includes a reduced diameter section that extends through an opening formed in the base wall of the engagement member such that cam section and the end section are located on opposite sides of the base wall. The shaft includes an expanded end section coupled to the reduced diameter section defining the end of the shaft. A biasing element engages the engagement member and provides a force that biases the engagement member toward engagement with the pivoting head.

In various embodiments, the biasing element is a spiral spring, and the cam section includes a major axis and a minor axis. When the actuator is moved to the unlocked position, the shaft is rotated such that the major axis of the cam section aligns with an axis of the spiral spring causing the spiral spring to compress. When the actuator is moved to the locked position, the shaft is rotated such that the minor axis aligns with an axis of the spiral spring allowing the spiral spring to expand pushing the engagement mechanism to engage the pivoting head. In specific embodiments, the cam section is asymmetrical in cross-section about the minor axis and/or major axis. In various embodiments, the body defines a cavity in which the engagement member is located and secondary cavity with a diameter less than the diameter of the cavity that receives an end of the spiral spring.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments, and together with the description serve to explain principles and operation of the various embodiments.

DETAILED DESCRIPTION

Referring generally to the figures, various embodiments of a tool with a pivoting head and locking mechanism are shown. As discussed in detail below, Applicant has designed a locking mechanism for a tool with a pivoting head that provides for robust locking operating, secure assembly within a tool body and decreased complexity. In a specific embodiment, the design discussed here includes a switch with an integral shaft with a centrally located cam section. The cam section engages a locking shuttle during rotation of the switch to move the locking shuttle between locked and unlocked positions. The shaft includes an end opposite the switch that extends through an opening in the shuttle to secure the shaft to the shuttle.

Figure 1:
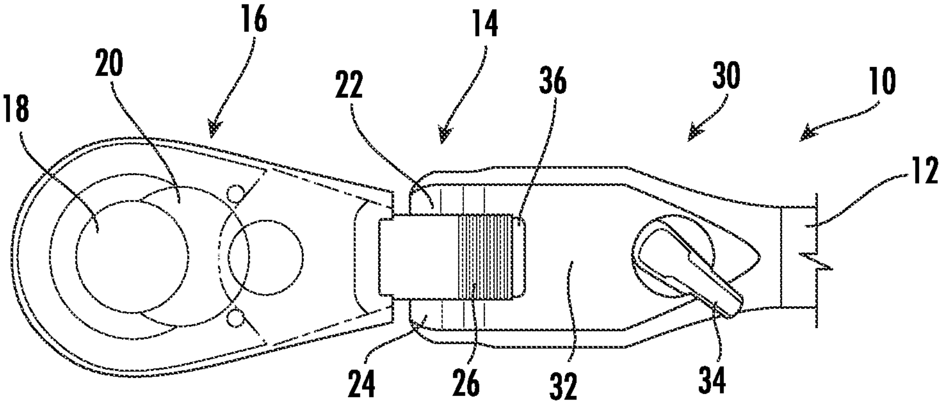
FIG. 1 is a top view of a ratchet wrench with a pivoting head, according to an exemplary embodiment.

Referring to FIG. 1, a tool, such as wrench 10, is shown according to an exemplary embodiment. In the embodiment shown, wrench 10 is a ratchet wrench including a tool body or handle 12, a pivot joint 14 and a pivoting portion, shown as ratchet head 16. In general, pivot joint 14 is located between handle 12 and ratchet head 16 and allows the user to change the angular position of ratchet head 16 relative to handle 12.

As will be understood, ratchet head 16 includes a workpiece engagement structure 18 and a ratchet mechanism 20. In general workpiece engagement structure 18 may be any structure that allows for engagement of a workpiece (e.g., a fastener, a bolt, a nut, etc.), and tool body 12 acts as a handle and a lever to apply torque to the workpiece. In specific embodiments, workpiece engagement structure 18 is a post configured to releasably engage a socket. In other embodiments, workpiece engagement structure 18 is a variety of other torque applying workpiece engagement structures, such as a screw driver head, an open wrench head, a closed wrench head, etc.

As will be generally understood, ratchet mechanism 20 is supported within ratchet head 16, and coupled to workpiece engagement structure 18 such that ratchet mechanism 20 provides ratcheting action to workpiece engagement structure 18. In general, ratchet mechanism 20 is a mechanical structure that allows for free or unrestricted rotation of handle 12 around workpiece engagement structure 18 in a first direction and allows for restricted or driving rotation of handle 12 around workpiece engagement structure 18 in a second direction opposite of the first direction. Wrench 10 may include a selection mechanism that allows the user to select which rotational direction provides driving rotation and which provides free rotation.

Figure 2:
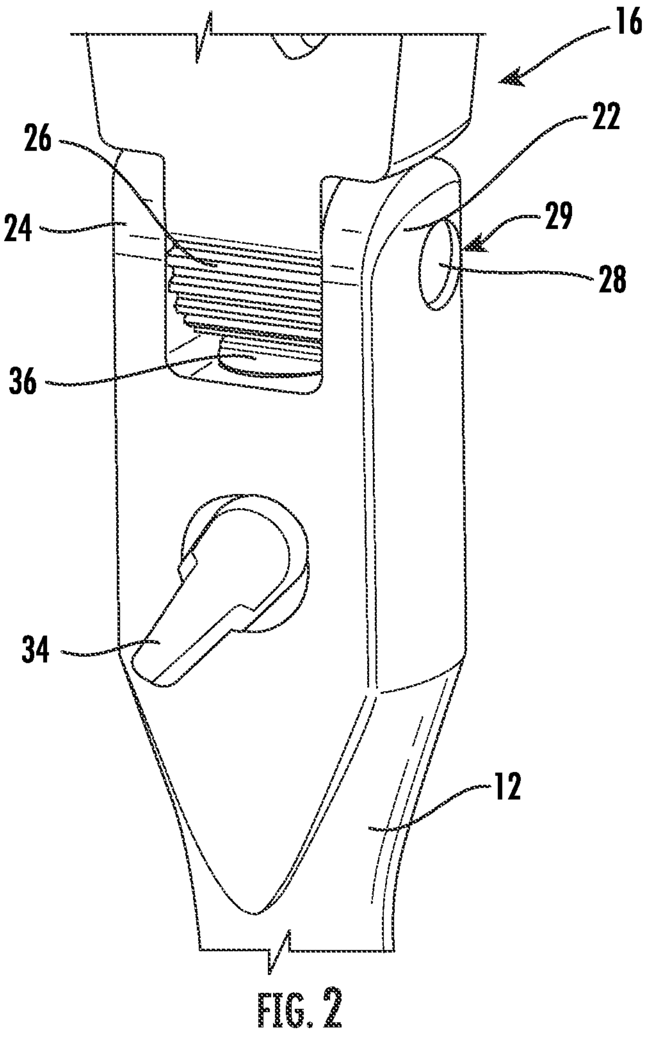
FIG. 2 is a detailed perspective view of a pivot joint of the ratchet wrench of FIG. 1, according to an exemplary embodiment.

Referring to FIG. 1 and FIG. 2, wrench 10 includes a pivot joint 14 that allows the user to adjust the angular position of ratchet head 16 relative to handle 12. Wrench 10 includes flanges or arms 22 and 24 located at an engagement end of handle 12 positioned proximate or adjacent to ratchet head 16. Ratchet head 16 includes a toothed projection 26 that is positioned between arms 22 and 24. An axle or pin 28 extends through openings 29 through arms 22 and 24 and through toothed projection 26 such that pin 28 rotatably couples ratchet head to handle 12.

Wrench 10 includes a locking mechanism 30 that allows the user to selectably and reversibly lock ratchet head 16 in a desired angular position relative to the body 12. Locking mechanism 30 is moveable between a locked position in which the angular position of head 16 relative to body 12 is fixed and an unlocked position in which head 16 is pivotable about pivot joint 14. In general, locking mechanism 30 includes an engagement member, shown as shuttle 32, and a control mechanism 34. In general, when a user moves control mechanism 34 to a locked position, engagement portion 36 of shuttle 32 engages toothed projection 26 of ratchet head 16, locking ratchet head 16 in the desired angular position. Then, when a user moves control mechanism 34 to an unlocked position, engagement portion 36 of shuttle 32 disengages from toothed projection 26 of ratchet head 16, allowing ratchet head 16 to freely pivot about pin 28. Shuttle 32 includes a longitudinal axis parallel to a longitudinal axis of handle 12.

Figure 3:
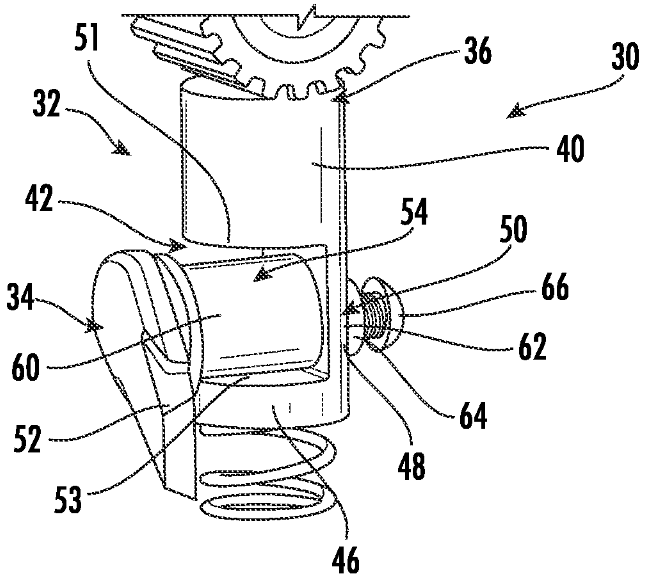
FIG. 3 is a perspective view of a locking mechanism of the ratchet wrench of FIG. 1, according to an exemplary embodiment.
Figure 4:
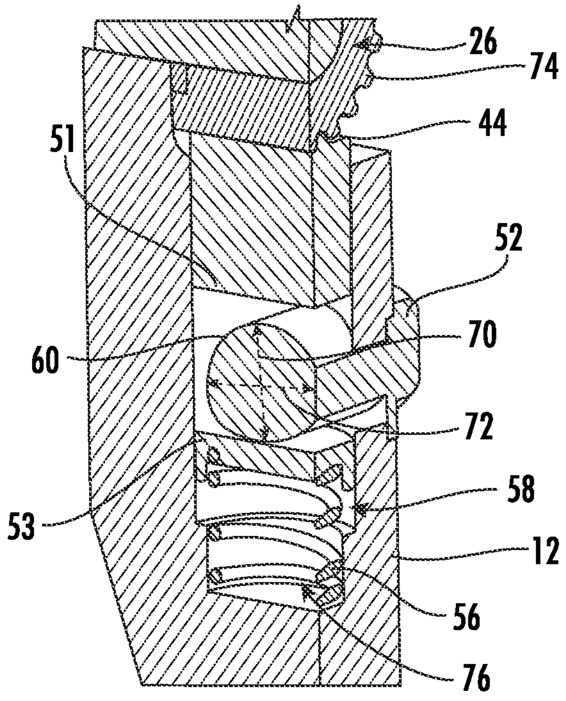
FIG. 4 is a perspective, sectional view of the locking mechanism of FIG. 3 in a locked position, according to an exemplary embodiment.
Figure 5:
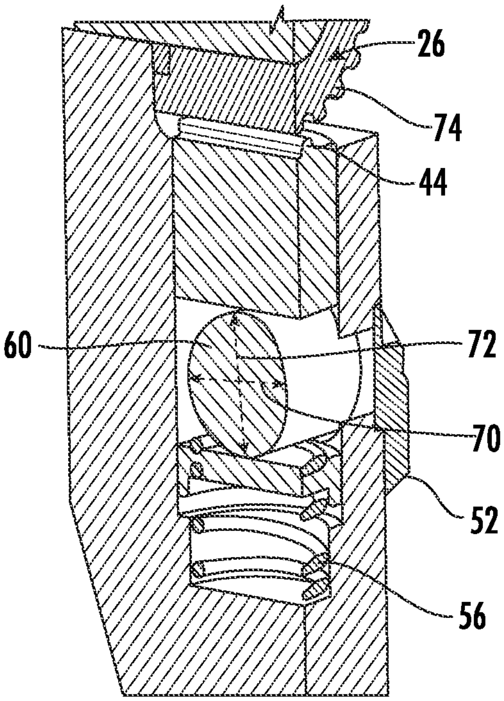
FIG. 5 is a perspective, sectional view of the locking mechanism of FIG. 3 in an unlocked position, according to an exemplary embodiment.

Referring to FIGS. 3-5, details of locking mechanism 30 are shown according to an exemplary embodiment. As shown in FIG. 3, shuttle 32 includes a body 40 defining an open section 42. Shuttle 32 includes a plurality of teeth 44 located at engagement portion 36, an end wall 46, a base wall 48, an opening 50 through base wall 48 and a pair of opposing sidewalls 51 and 53. As shown in FIG. 3, sidewalls 51 and 53 and the inner surface of base wall 48 define open section 42.

Control mechanism 34 includes an actuator, shown as switch 52, and a shaft 54 coupled to and extending from switch 52. In addition, locking mechanism 30 includes a biasing element, shown as spiral spring 56. Body 12 defines a cavity 58 located adjacent pivot joint 14, and, as shown best in FIGS. 4 and 5, various components of locking mechanism 30 are located within cavity 58.

Referring specifically to control mechanism 34, shaft 54 includes a cam section 60, a reduced diameter section 62, and an end 64 opposite of switch 52. In the embodiment shown, cam section 60 is located in a central portion of shaft 54 between reduced diameter section 62 and switch 52. When assembled with shuttle 32, cam section 60 extends within and is located within open section 42 of shuttle 32 and reduced diameter section 62 passes through opening 50 defined within base wall 48 of shuttle 32. End 64 is located on the opposite side of base wall 48 from open section 42. In the embodiment shown in FIG. 3, a screw 66 is coupled to end 64. Applicant has found that by configuring control mechanism 34 such that the end of shaft, opposite from switch 52, extends through shuttle 32 (as opposed to having the end of the shaft terminate within open section 42) a more robust, secure coupling is achieved between the components of locking mechanism 30 and relative to handle 12.

Referring to FIG. 4 and FIG. 5, in a specific embodiment, cam section 60 is sized and shaped relative to the shape of sidewalls 51 and 53 such that rotation of switch 52 causes rotation of cam section 60 such that the outer surface of cam section engages with sidewall 53. This engagement in turn causes movement of locking mechanism 30 between locked and unlocked positions. In another embodiment, cam section 60 is sized and shaped relative to the shape of sidewalls 51 and 53 such that the outer surface of cam section 60 does not always engage (e.g., touch) sidewall 53. Specifically, cam section 60 has a cross-sectional shape having a minor dimension or axis 70 and a major dimension or axis 72. As shown in FIG. 4, when switch 52 is rotated to the locked position, minor axis/dimension 70 is aligned with the compression axis of spring 56. The compression axis of spring 56 is parallel to the longitudinal axis of handle 12. In this position, spring 56 is allowed to expand pushing teeth 44 of shuttle 32 into engagement with teeth 74 of toothed projection 26 such that ratchet head 16 is locked in place as selected by the user. Applicant has found this action by spring 56 increases the allowable tolerances of the components of locking mechanism 30 and specifically the teeth (e.g., teeth 44 of shuttle 32 and teeth 74 of toothed projection 26).

As shown in FIG. 5, when switch 52 is rotated to the unlocked position, major axis/dimension 72 is aligned with the compression axis of spring 56. In this position, spring 56 is compressed, and shuttle 32 is pushed away from toothed projection 26 such that teeth 44 of shuttle 32 are disengaged from teeth 74 of toothed projection 26. In this disengaged or unlocked position, ratchet head 16 is allowed to freely rotate about pin 28 such that the user can select the desired angular position of head 16. Switch 52 is at least partially constrained by an opening or pocket in handle 12. When switch 52 is positioned over the center of major axis 72, biasing spring 56 pushes against switch 52 creating a torque that moves or pushes a portion (e.g., the side) of switch 52 against the opening in handle 12. This arrangement allows locking mechanism 30 to stably hold ratchet head 16 and handle 12 while unlocked if an operator prefers to use wrench 10 while ratchet head 16 is able to pivot freely. If the operator prefers to lock wrench 10, once the desired position is selected, switch 52 can be moved back to the locked position of FIG. 4, causing shuttle 32 to re-engage ratchet head 16 locking it in the selected position as described above.

In addition to the structures discussed above, Applicant has developed innovations to the design of locking mechanism 30 to further improve performance of a tool including locking mechanism 30. As shown in FIG. 4 and FIG. 5, in one embodiment, cavity 58 within handle 12 includes a reduced diameter end section 76. In this embodiment, the diameter of end section 76 is less than a diameter of cavity 58 and acts to closely capture and retain an end of spring 56 opposite shuttle 32. Further, in one embodiment, cam section 60 has a continuously curved outer perimeter (e.g., with no corners or flat sections), and in a specific embodiment, cam section 60 defines a cross-sectional profile that is asymmetrical about minor axis 70 and/or major axis 72. In a specific embodiment, cam section 60 is shaped to unlock when the cam is over-center by 2-5 degrees, allowing shuttle 32 to be held in the unlocked position as previously discussed. In various embodiments, this shape provides a robust and efficient cam locking mechanism. In specific embodiments, various portions of control mechanism 34, including cam section 60, reduced diameter section 62, end 64 and switch 52 are all formed from an integral piece of material (e.g., metal material) providing robust and simple design.

In various embodiments, spring 56 is configured to provide a locking spring force sufficient to secure ratchet head 16 in various angular locked positions. In various embodiments, spring 56 delivers a spring force between 1 and 2 lbf. In a specific embodiment, wrench 10 is a ¼" wrench, and spring 56 has a spring force of about 1.3 lbf. In a specific embodiment, wrench 10 is a ⅜" wrench, and spring 56 has a spring force of about 1.4 lbf. In a specific embodiment, wrench 10 is a ½" wrench, and spring 56 has a spring force of about 1.5 lbf.

In various embodiments, spring 56 delivers a spring force between 8 N and 20 N. In a specific embodiment, wrench 10 is a ¼" wrench, and spring 56 has a spring force between 12 N and 18 N and more specifically about 16.33 N (e.g., 16.33 N±1 N). In such an embodiment, spring 56 has a spring rate of about 2.42 N/mm (e.g., 2.42 N/mm±0.25 N/mm). In a specific embodiment, wrench 10 is a ⅜" wrench, and spring 56 has a spring force between 8 N and 12 N and more specifically about 9.56 N (e.g., 9.56 N±1 N). In such an embodiment, spring 56 has a spring rate of about 2.81 N/mm (e.g., 2.81 N/mm±0.25 N/mm). In a specific embodiment, wrench 10 is a ½" wrench, and spring 56 has a spring force between 8 N and 14 N and more specifically about 11 N (e.g., 11 N±1 N). In such an embodiment, spring 56 has a spring rate of about 4.79 N/mm (e.g., 4.79 N/mm±0.25 N/mm).

Figure 6:
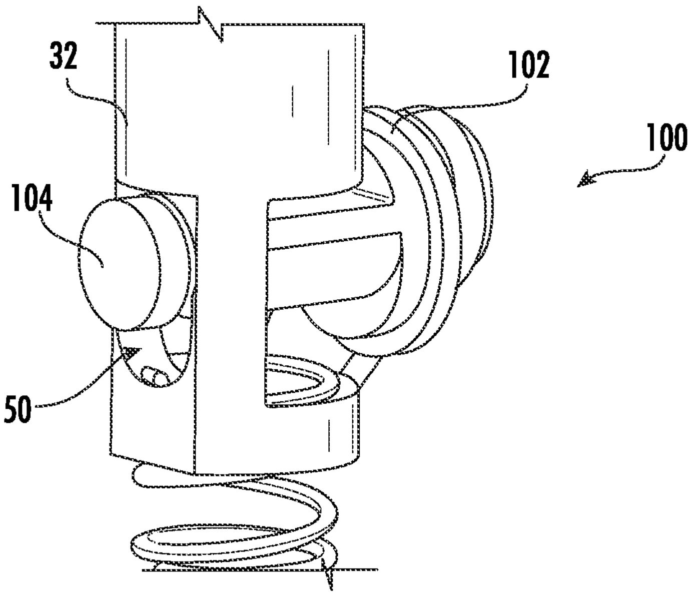
FIG. 6 is a perspective view of a locking mechanism for a ratchet wrench, according to another embodiment.
Figure 7:
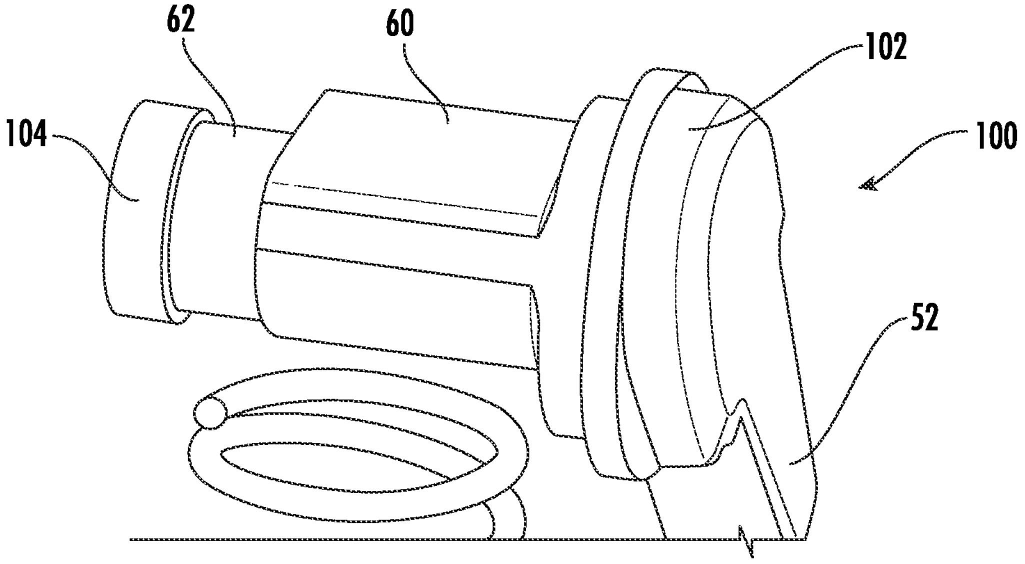
FIG. 7 is a detailed perspective view of a locking switch and cam shaft of the locking mechanism of FIG. 6, according to an exemplary embodiment.

Referring to FIG. 6 and FIG. 7, a locking mechanism 100 for a pivoting head tool is shown according to an exemplary embodiment. Locking mechanism 100 is substantially the same as locking mechanism 30 except for the differences discussed herein. Specifically, locking mechanism 100 includes a control mechanism 102 with the geometry shown in FIG. 7. In this arrangement, control mechanism 102 includes switch 52, shaft 54, cam section 60 and reduced diameter section 62. However, in contrast to control mechanism 34, control mechanism 102 includes an integral, expanded end section 104 located at the end 64 of shaft 54 opposite switch 52 in place of screw 66. In a specific embodiment, expanded section 104 is a cylindrical portion that has a diameter greater than the diameter of reduced diameter section 62. In this embodiment, the circular cross-sectional profile shape of expanded end section 104 is different than the cross-section profile shape of cam section 60.

As shown in FIG. 6, opening 50 in base wall 48 is elongate in shape. Shaft 54 extends through opening 50 such that reduced diameter section 62 resides within opening 50. Expanded section 104 is located along the outer surface of base wall 48 and acts to capture/position control mechanism 102 relative to shuttle 32. A longitudinal axis of shaft 54 is perpendicular to the longitudinal axis of handle 12.

Figure 8:
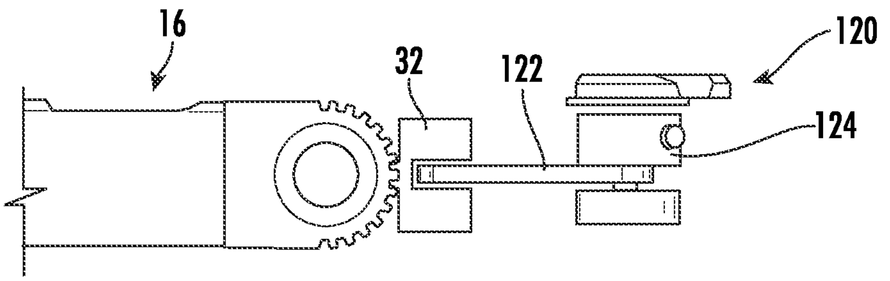
FIG. 8 is a side view of a locking mechanism for a ratchet wrench in a locked position, according to another exemplary embodiment.
Figure 9:
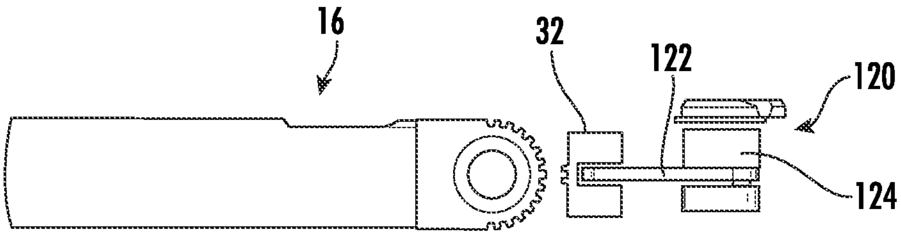
FIG. 9 is a side view of the locking mechanism of FIG. 8 in an unlocked position, according to another exemplary embodiment.
Figure 10:
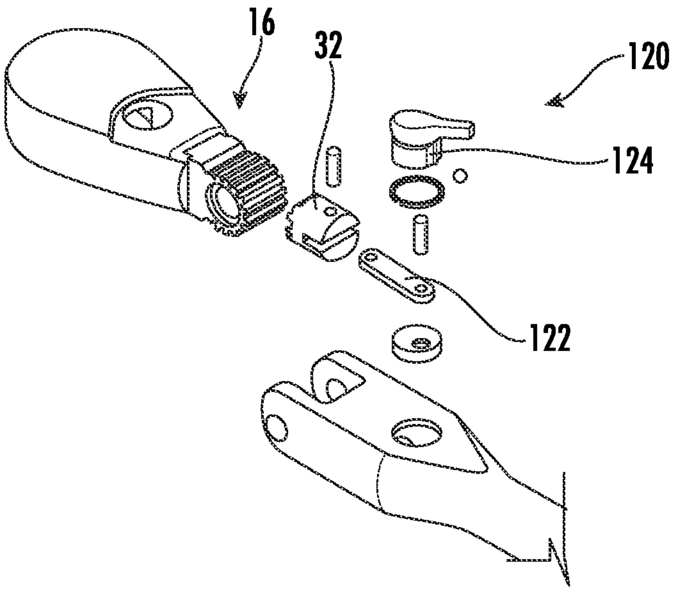
FIG. 10 is an exploded view of the locking mechanism of FIG. 8, according to an exemplary embodiment.

Referring to FIGS. 8-10, a locking mechanism 120 for a pivoting head tool is shown according to an exemplary embodiment. Locking mechanism 120 is substantially the same as locking mechanism 30 except for the differences discussed herein. FIG. 8 shows locking mechanism 120 in the locked position, and FIG. 9 shows locking mechanism 120 in the unlocked position. Locking mechanism 120 uses a linkage 122 coupled to a cam structure 124 attached to switch 52. Rather than using a cam shaft, the cam structure 124 of switch 52 moves linkage 122 to an extended position in which shuttle 32 locks pivot head 16 in place as shown in FIG. 8. When switch 52 is moved to the unlocked position, linkage 122 moves to a retracted position in which shuttle 32 disengages from pivot head 16 as shown in FIG. 9. Note, FIG. 10 shows the contour of cam structure 124 that is difficult to see in FIGS. 8-9.

Referring to FIGS. 11-16, locking mechanism 30 includes a damping member. As will be discussed in greater detail below, a damping member positioned within the spring is believed to act to limit or prevent the tool components from coming apart and/or breaking when the tool is dropped and/or subjected to an external force.

Figure 11:
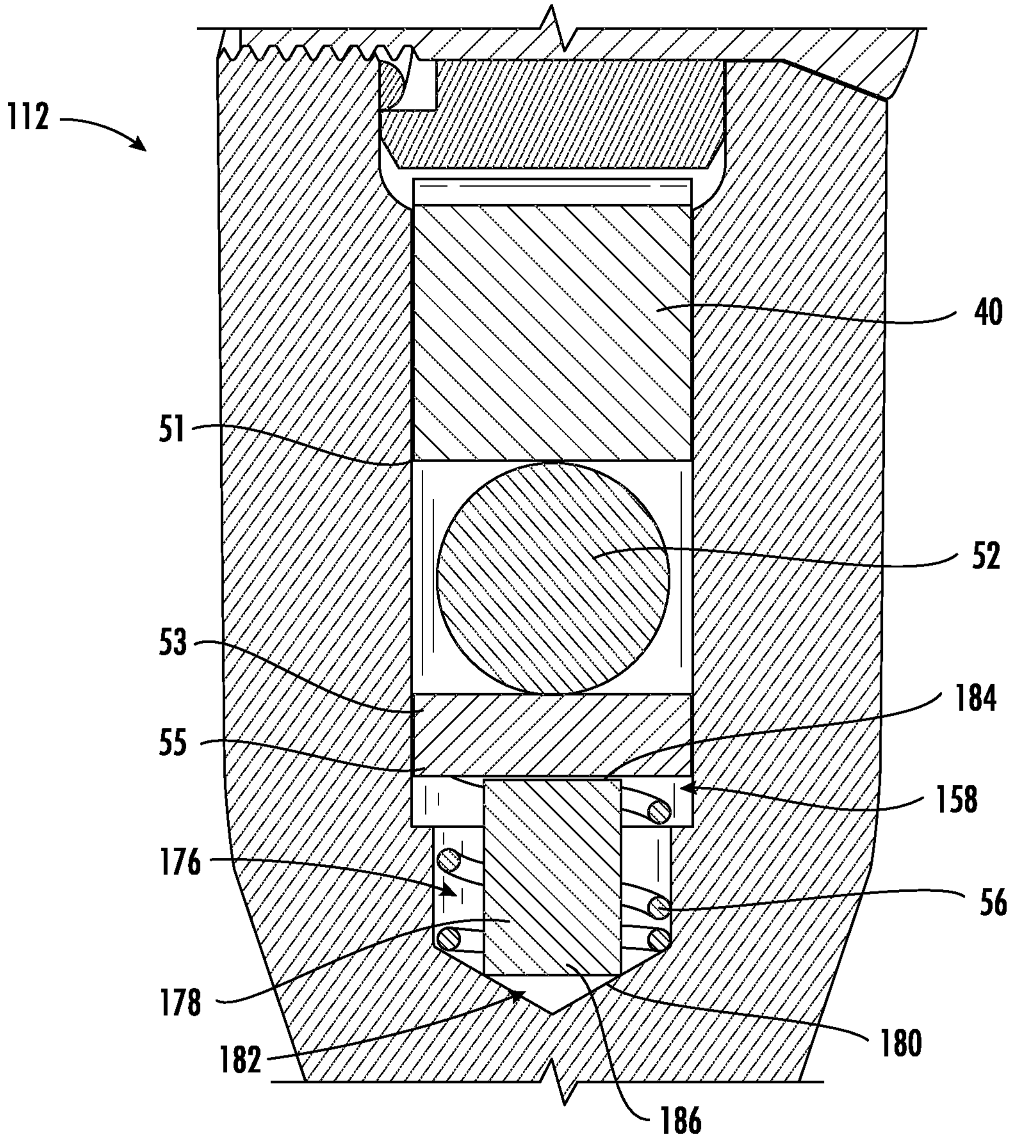
FIG. 11 is a cross-sectional view of a locking mechanism of a ratchet wrench with a damper, according to an exemplary embodiment.
Figure 12:
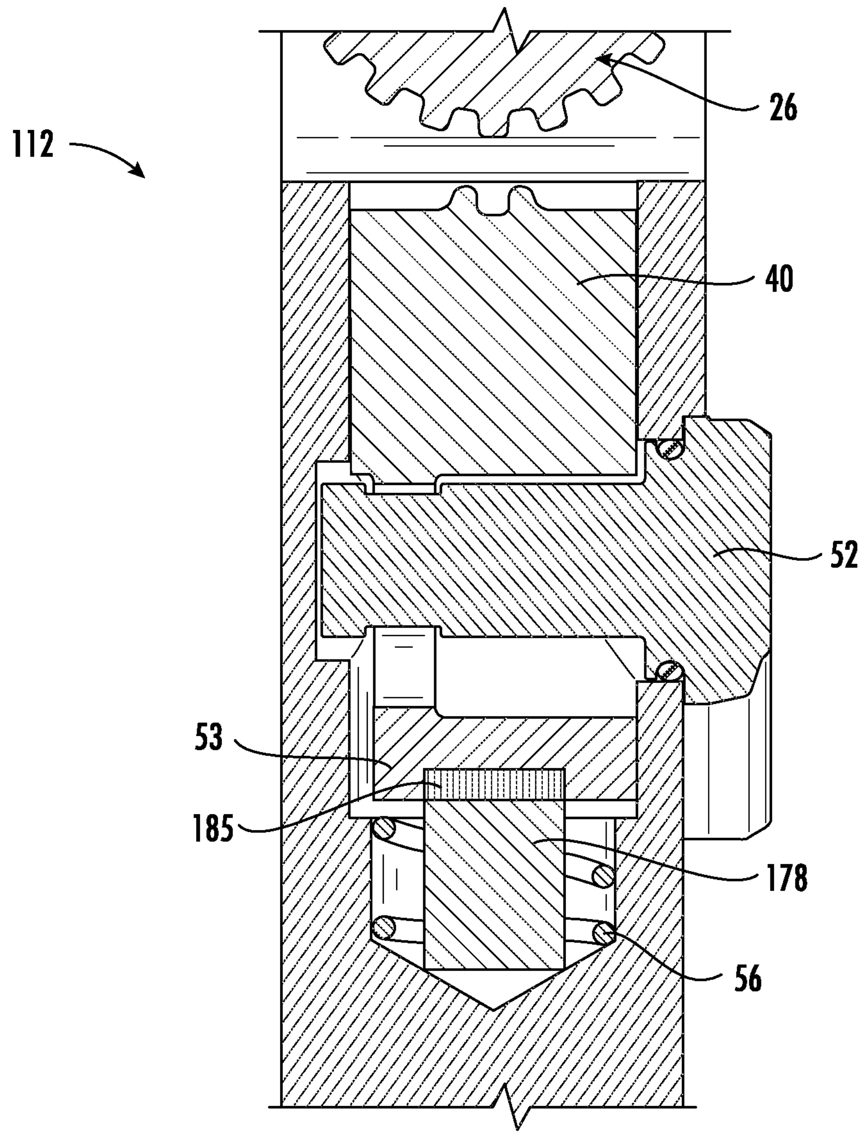
FIG. 12 is a cross sectional view of the locking mechanism of FIG. 11 with the damper in an engaged position, according to an exemplary embodiment.
Figure 13:
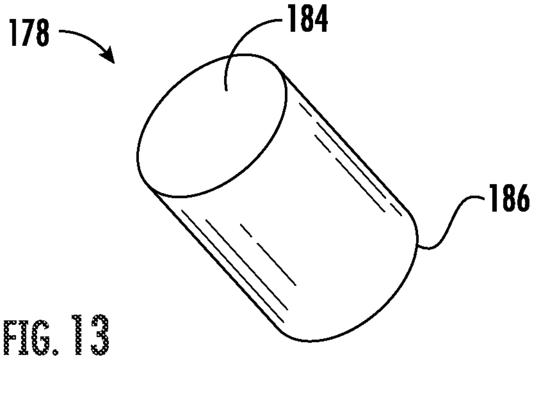
FIG. 13 is a perspective view of the damper of the locking mechanism of FIG. 11, according to an exemplary embodiment.

Referring to FIGS. 11-13, a handle 112 for a pivoting head tool is shown according to an exemplary embodiment. Handle 112 is substantially the same as handle 12 except for the differences discussed herein and can be utilized with locking mechanism 30 and/or locking mechanism 120. As shown in FIG. 11, locking mechanism 30 is in an unlocked position. In one embodiment, a cavity 158 within handle 112 includes a reduced diameter end section 176. In this embodiment, the diameter of reduced diameter end section 176 is less than a diameter of cavity 158 and acts to closely capture and retain an end of spring 56 opposite body 40 of shuttle 32. A distal end 182 of reduced diameter end section 176 includes a pair of angled walls 180. In a specific embodiment, angled walls 180 extend toward the center of distal end 182 and form a point (e.g., a drill point).

In a specific embodiment, locking mechanism 30 includes a damper 178 positioned within spring 56. In a specific embodiment, damper 178 is formed from a rubber material. In another embodiment, the damper may be formed from a polymer, or clastic dampening material. When shuttle 32 is in the lowest natural position within cavity 158, damper 178 does not contact shuttle 32 and specifically an upward facing surface 184 (in the orientation of FIGS. 11-12) of damper 178 does not contact a downward facing surface 55 of sidewall 53.

Referring to FIG. 12, handle 112 and locking system 30 are shown with damper 178 in an engaged position, according to an exemplary embodiment. When shuttle 32 is acted upon by an external force (e.g., wrench is dropped, etc.) and moves down within cavity, upward facing surface 184 of damper 178 contacts the downward facing surface 55 of sidewall 53. The contact between the damper 178 and sidewall 53 prevent body 40 from moving too far toward reduced diameter end section 176 and/or rebounding with force into toothed projection 26. The cross-hatching of section 185 demonstrates the engagement between sidewall 53 and damper 178 (e.g., damper compression). Applicant has found, the use of a damping member such as damper 178 prevents the tool or wrench components from coming apart when the tool is dropped and/or absorbs an external force.

Referring to FIG. 13, a perspective view of damper 178 is shown. In a specific embodiment, damper 178 includes upward facing surface 184 and an opposing downward facing surface 186. Downward facing surface 186 engages with angled walls 180 of distal end 182. In a specific embodiment, the damper has a cylindrical shape. In other embodiments, the damper may have a different shape (e.g., rectangular, polygonal, etc.).

Figure 14:
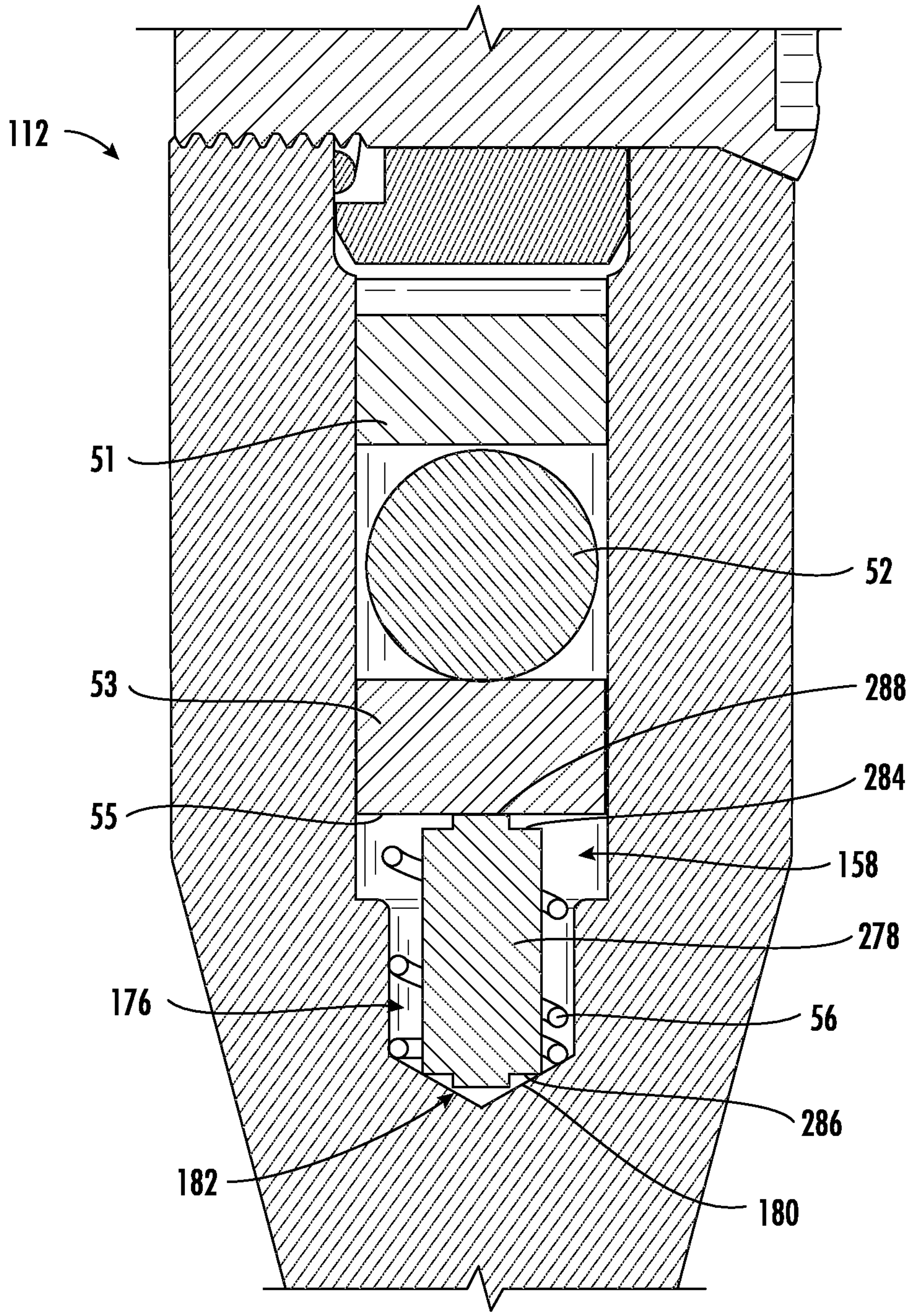
FIG. 14 is a cross-sectional view of a locking mechanism of a ratchet wrench with a damper, according to another exemplary embodiment.
Figure 15:
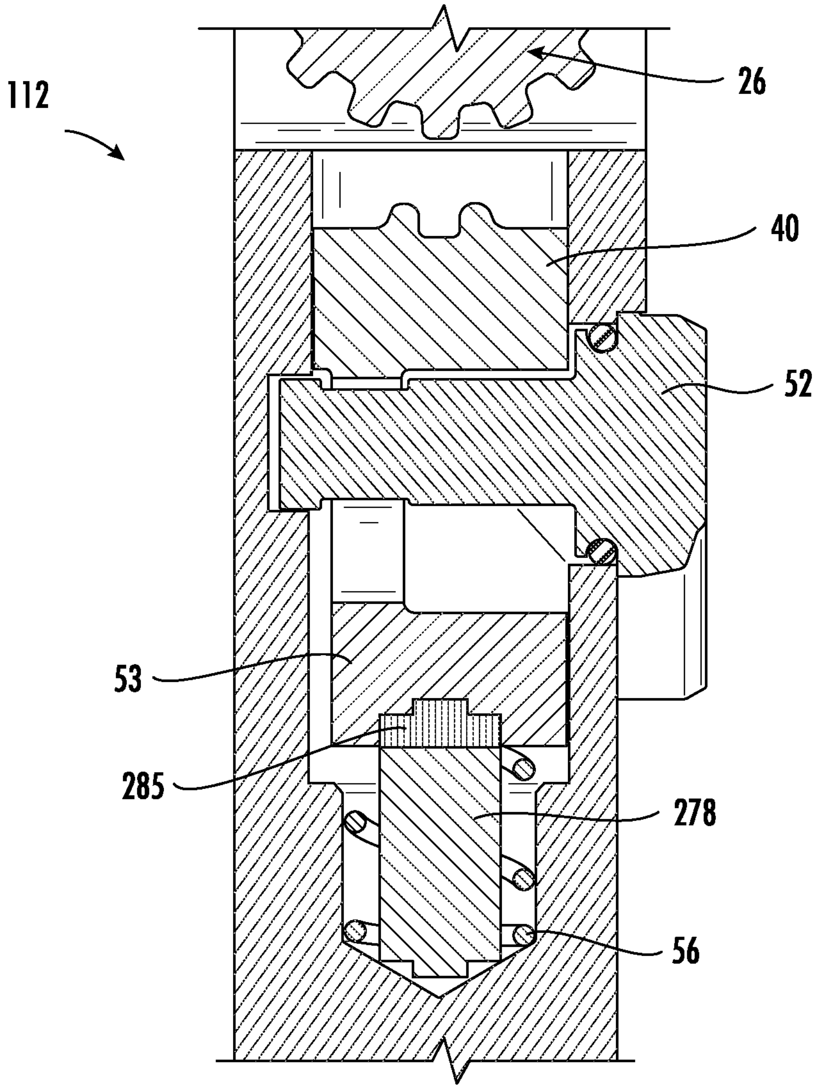
FIG. 15 is cross sectional view of the locking mechanism of FIG. 14 with the damper in an engaged position, according to an exemplary embodiment.
Figure 16:
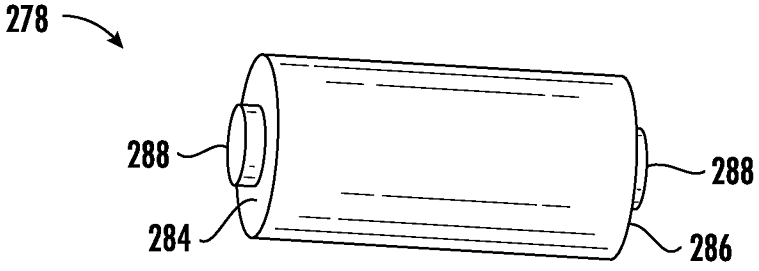
FIG. 16 is a perspective view of the damper of the locking mechanism of FIG. 14, according to an exemplary embodiment.

Referring to FIGS. 14-16, a damper 278 that can be utilized with locking mechanism 30 and/or locking mechanism 120 is shown according to an exemplary embodiment. Damper 278 is substantially the same as damper 178 except for the differences discussed herein. When shuttle 32 is in the lowest natural position within cavity 158, damper 278 contacts shuttle 32 and specifically an end component 288 coupled to an upward facing surface 284 (in the orientation of FIGS. 14-15) of damper 278 contacts downward facing surface 55 of sidewall 53. This contact prevents damper 278 from moving freely which might cause spring 56 to jam. The cross-hatching of section 285 demonstrates the engagement between sidewall 53 and damper 278 (e.g., damper compression).

Referring to FIG. 15, handle 112 and locking system 30 are shown with damper 278 in an engaged position, according to an exemplary embodiment. When shuttle 32 is acted upon by an external force (e.g., wrench is dropped etc.) and moves down within cavity 158, end component 288 of damper 278 contacts the downward facing surface 55 of sidewall 53. The contact between the damper 278 and sidewall 53 prevent body 40 from moving too far toward reduced diameter end section 176 and/or rebounding with force into toothed projection 26.

Referring to FIG. 16, a perspective view of damper 278 is shown. In a specific embodiment, damper 278 includes upward facing surface 284 and an opposing downward facing surface 286. Both upward facing surface 284 and downward facing surface 286 include an end component 288. At least a portion of downward facing surface 286 and end component 288 engage with angled walls 180 of distal end 182. The shape of damper 278 allows for a more consistent response and/or force to be applied to sidewall 53 because the load is not only placed on the edges of downward facing surface of the damper due to the point at distal end 182 of reduced diameter end section 176 (see e.g., FIG. 12).

In a specific embodiment, the end component of the damper has a cylindrical shape. In other embodiments, the end component of the damper may have a different shape (e.g., rectangular, polygonal, etc.). In a specific embodiment, the end components are coupled to the cylindrical body of the damper. In another embodiment, the damper is a single, unitary component.

It should be understood that while the disclosure herein relates primarily to ratchet wrenches, the locking member embodiments discussed herein can be used with a variety of tools with pivoting heads or other portions, such as handles.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A driving tool, comprising:

a body that defines a cavity, the cavity including:

a first diameter; and a reduced diameter end section having a second diameter, the first diameter being greater than the second diameter;

a head;

a workpiece engagement structure coupled to the head;

a pivot joint positioned between the body and the head, the pivot joint coupling the body to the head such that the head is pivotable about the pivot joint to a plurality of angular positions relative to the body; and a locking mechanism positioned within the cavity of the body, the locking mechanism comprising:

an engagement member, the engagement member including an open section defined between a pair of opposing sidewalls and a base wall, the base wall comprising an opening;

a control mechanism including a shaft coupled to and extending from an actuator, and an end section of the shaft opposite the actuator, wherein the shaft extends into the open section of the engagement member and through the opening of the base wall, and wherein the end section is positioned within the cavity; and a biasing element that engages with the engagement member, biasing the engagement member toward the head, an end of the biasing element opposite the engagement member being retained in the reduced diameter end section of the cavity;

a dampening member including a first end retained in the reduced diameter end section of the cavity;

wherein the locking mechanism is moveable between a locked position in which the angular position of the head relative to the body is fixed and an unlocked position in which the head is pivotable about the pivot joint.

2. The driving tool of claim 1, wherein the dampening member further includes a second end opposite the first end, the second end comprising a continuous upper surface configured to engage one of the opposing side walls of the engagement member; and wherein the dampening member is formed from a polymer material.

3. The driving tool of claim 2, wherein the biasing element is a helical spring, and the dampening member is positioned within and is surrounded by the helical spring.

4. The driving tool of claim 1, wherein the shaft of the control mechanism further comprises:

a cam section positioned between the actuator and the end section of the shaft; and a reduced diameter section positioned between the cam section and the end section of the shaft;

wherein the cam section extends within the open section of the engagement member.

5. The driving tool of claim 4, wherein the reduced diameter section of the shaft passes through the opening and the end section of the shaft is positioned on an opposing side of the base wall from the open section of the engagement member.

6. The driving tool of claim 4, wherein the cam section of the shaft includes a major axis and a minor axis and wherein when the actuator is moved to the unlocked position, the shaft is rotated such that the major axis of the cam section aligns with a compression axis of the biasing element causing the biasing element to compress.

7. The driving tool of claim 6, wherein when the actuator is moved to the locked position, the shaft is rotated such that the minor axis of the cam section aligns with the compression axis of the biasing element causing the biasing element to expand and push the engagement member into engagement with the head.

8. The driving tool of claim 1, further comprising a ratchet mechanism supported by the head and coupled to the workpiece engagement structure.

9. A driving tool, comprising:

a body that defines a cavity, the cavity comprising a distal end;

a head coupled to the body such that the head is pivotable about a pivot joint to a plurality of angular positions relative to the body, the head including a toothed projection extending toward the body;

a workpiece engagement structure coupled to the head; and a locking mechanism positioned within the cavity of the body, the locking mechanism comprising:

an engagement member, the engagement member including an open section defined between a pair of opposing sidewalls and a base wall, the base wall comprising an opening;

a control mechanism including a shaft coupled to and extending from an actuator and an expanded end section of the shaft opposite the actuator, wherein the shaft extends into the open section of the engagement member and through the opening of the base wall, and wherein the expanded end section is positioned within the body;

a biasing element that engages with the engagement member, biasing the engagement member toward the head; and a dampening member positioned in the distal end of the cavity;

wherein the distal end of the cavity is defined by an angled wall that extends away from the pivot joint and at an angle such that the cavity narrows toward the distal end;

wherein the head is moveable between a locked position in which the biasing element pushes the engagement member into engagement with the head such that the angular position of the head is fixed relative to the body and an unlocked position in which the head is pivotable relative to the body.

10. The driving tool of claim 9, wherein the dampening member further comprises a first end and a second end opposite the first end; and wherein the first end is configured to engage one of the sidewalls of the engagement member and the second end is configured to engage the angled wall.

11. The driving tool of claim 10, wherein the dampening member further comprises:

a body portion between the first end and the second end, the body portion having a first width;

an end component extending from one of the first end and the second end, the end component defining an uppermost or lowermost surface of the dampening member, the end component having a second width that is less than the first width.

12. The driving tool of claim 9, further comprising a ratchet mechanism supported by the head and coupled to the workpiece engagement structure.

13. The driving tool of claim 9, wherein the shaft of the control mechanism further comprises:

a cam section positioned between the actuator and the expanded end section of the shaft; and a reduced diameter section positioned between the cam section and the expanded end section of the shaft;

wherein the cam section extends within the open section of the engagement member.

14. The driving tool of claim 13, wherein the body further includes a longitudinal axis parallel to a longitudinal axis of the engagement member and the shaft of the control mechanism further includes a longitudinal axis perpendicular to the longitudinal axis of the body, wherein the cam section of the shaft includes a major axis and a minor axis and wherein when the actuator is moved to the unlocked position, the shaft is rotated such that the major axis of the cam section aligns with a compression axis of the biasing element such that the biasing element is compressed, and the engagement member is pushed away from the toothed projection of the head.

15. The driving tool of claim 14, wherein the cam section defines a cross-sectional profile that is asymmetrical about the minor axis and the major axis of the cam section.

16. The driving tool of claim 9, wherein the angled wall extends to a center of the distal end of the cavity and forms a point.

17. A driving tool, comprising:

a body that defines a cavity;

a head coupled to the body such that the head is pivotable about a pivot joint to a plurality of angular positions relative to the body, the head including a toothed projection extending toward the body;

a workpiece engagement structure coupled to the head;

a locking mechanism positioned within the cavity of the body, the locking mechanism comprising:

an engagement member, the engagement member including an open section defined between a pair of opposing sidewalls and an interior surface of a base wall;

a control mechanism including a shaft coupled to and extending from an actuator, the shaft comprising an end opposite the actuator, wherein the shaft extends into the open section of the engagement member and through the interior surface of the base wall, and wherein the end of the shaft is positioned within the body; and a biasing element that engages with the engagement member, biasing the engagement member toward the head;

a dampening member positioned such that the engagement member is between the dampening member and the pivot joint, the dampening member including a first end and a second end opposite the first end;

wherein the head is moveable between a locked position in which the biasing element pushes the engagement member into engagement with the head such that the angular position of the head is fixed relative to the body and an unlocked position in which the head is pivotable relative to the body.

18. The driving tool of claim 17, wherein the dampening member comprises:

a body portion between the first end and the second end, the body portion having a first width;

an end component extending from one of the first end and the second end, the end component having a second width that is less than the first width, wherein the end component has a cylindrical shape.

19. The driving tool of claim 17, further comprising a ratchet mechanism supported by the head and coupled to the workpiece engagement structure.

20. The driving tool of claim 17, wherein the biasing element is a helical spring, and the dampening member is positioned within and surrounded by the helical spring, and wherein the dampening member has a cylindrical shape.

* * * * *